Dec. 26, 1950          H. C. CARMAN          2,535,900
ELECTRICALLY OPERATED SAW GAUGE
Filed Sept. 27, 1947          2 Sheets-Sheet 1
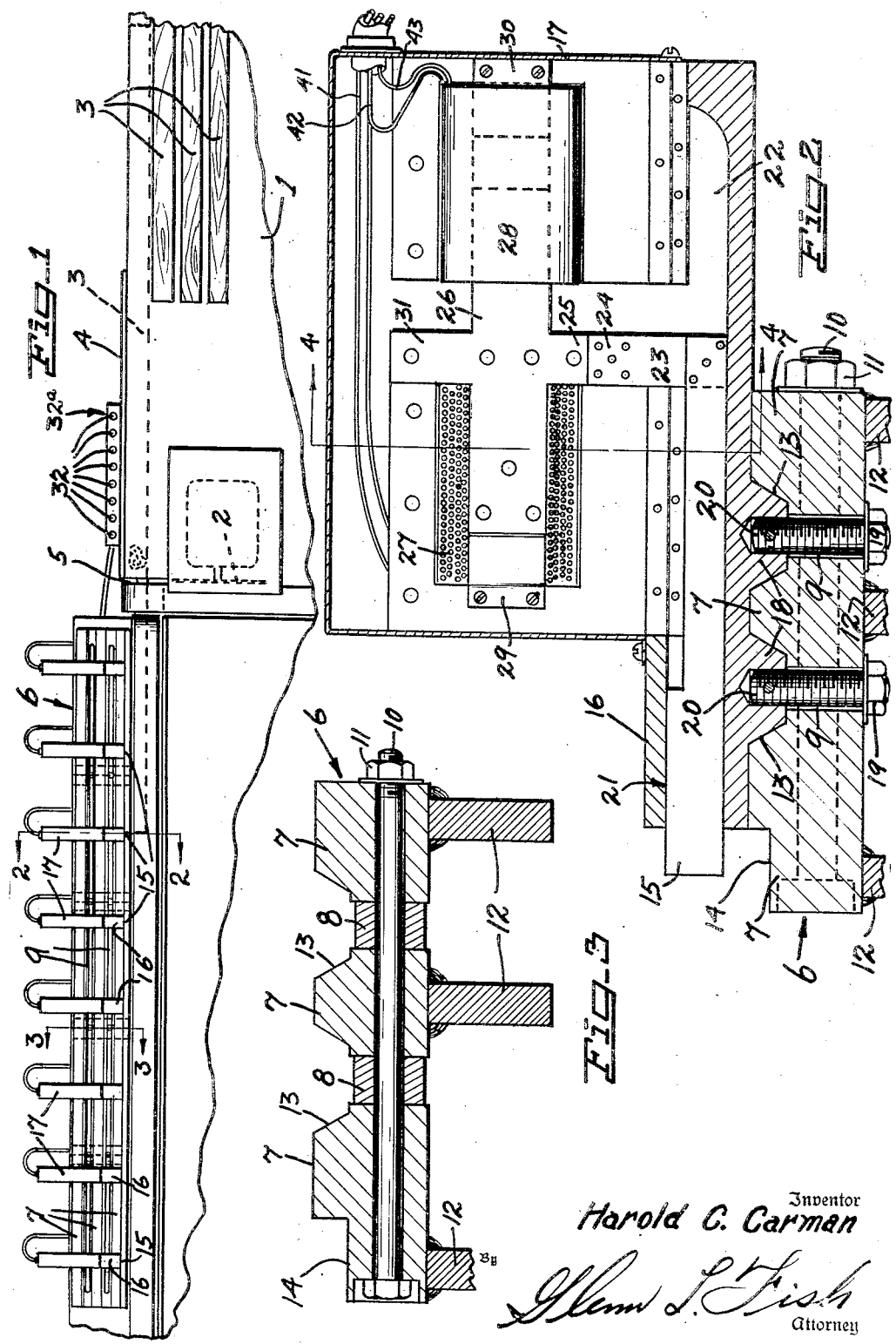
Inventor
Harold C. Carman
Glenn L. Fish
Attorney

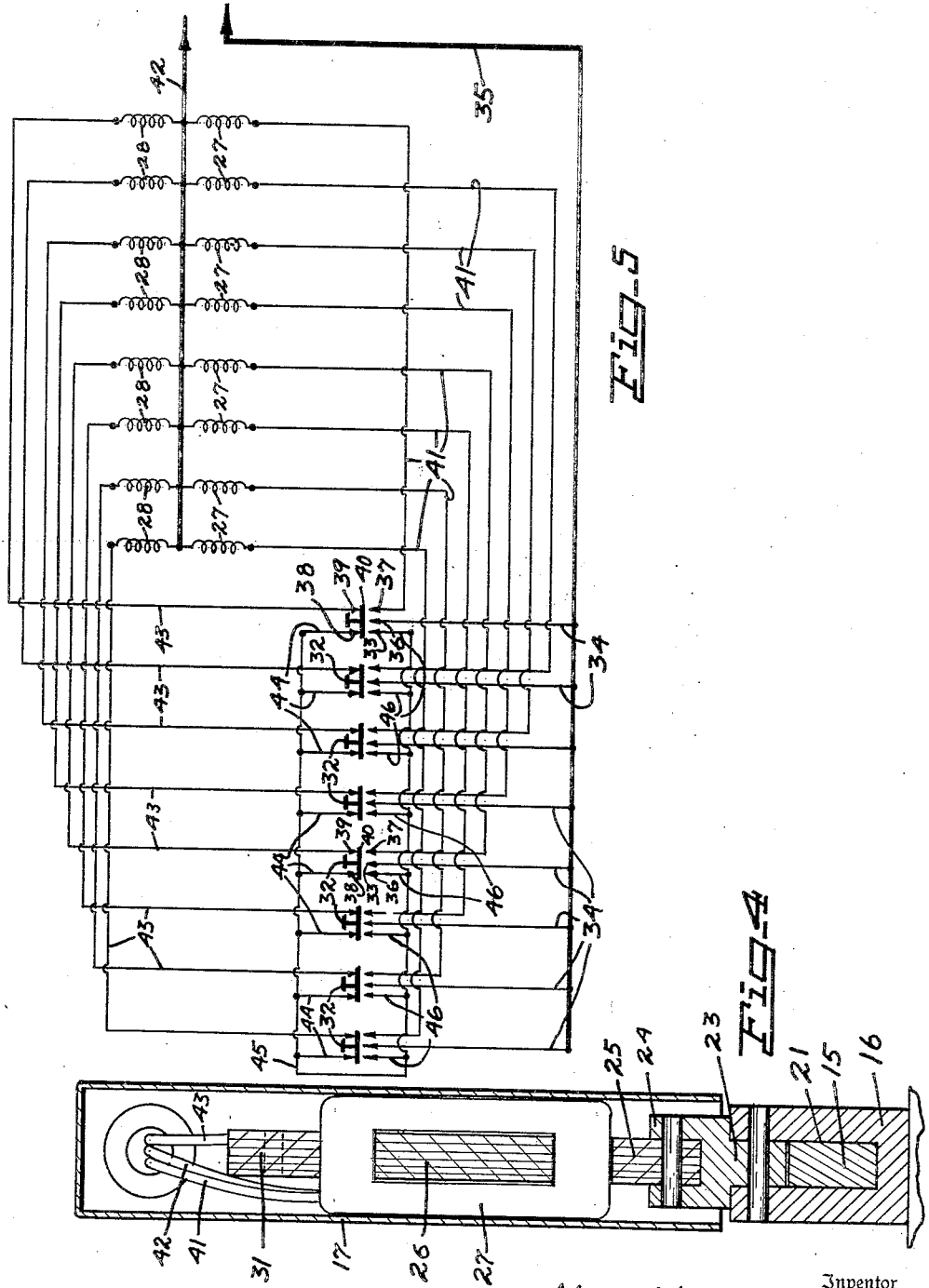

Patented Dec. 26, 1950

2,535,900

UNITED STATES PATENT OFFICE 2,535,900

ELECTRICALLY OPERATED SAW GAUGE

Harold C. Carman, Spokane, Wash., assignor to Western Pine Mfg. Company Limited, Spokane, Wash.

Application September 27, 1947, Serial No. 776,499

3 Claims. (Cl. 143—168)

This invention relates to a saw gauge and it is one object of the invention to provide a gauge which is particularly adapted for use in connection with a saw used for cutting long boards into short lengths and removing knotted and otherwise defective portions of the boards.

Another object of the invention is to provide a gauge adapted to be mounted at an end of a saw table in such position that a board may be slid along the table until a predetermined length of board projects from the table, the saw being then moved into cutting engagement with the board and thereby allowing short boards of a desired length to be obtained.

Another object of the invention is to provide a gauge having a base adapted to be mounted along a side edge of a saw table and a plurality of stops which are shiftable along the base to positions where they are secured and selected stops individually movable to extended positions for engagement by ends of long boards to be cut.

Another object of the invention is to provide a gauge wherein the stops are normally held in a retracted position and one allowed to be moved to an extended position while the others are held against movement from a retracted position.

Another object of the invention is to provide an arrangement of solenoids for controlling movements of the stops, there being a pair of solenoids for each stop and a wiring circuit so arranged that when a switch is closed to move one stop to an extended position the retracting solenoids for all of the stops except the one to be extended, will be energized to hold them in a retracted position and thus prevent accidental movement of more than one stop to an extended position.

Another object of the invention is to provide a gauge which is simple in construction, easy to operate, and not liable to get out of working order.

The invention is illustrated in the accompanying drawings wherein:

Fig. 1 is a top plan view showing the improved gauge mounted upon a sawing table.

Fig. 2 is a sectional view upon an enlarged scale taken transversely through the gauge upon the line 2—2 of Figure 1.

Fig. 3 is a sectional view taken transversely through the base of the gauge along the line 3—3 of Figure 1.

Fig. 4 is a transverse sectional view taken vertically along the line 4—4 of Figure 2.

Fig. 5 is a wiring diagram.

This improved gauge is intended for use in connection with a table 1 over which a saw 2 is mounted in such manner, that the saw may be moved transversely of the table and a long board 3 cut transversely into sections and thus form short boards of desired length. The boards are placed in a stack or pile upon the table and individually moved to a side of the table where they are placed in engagement with a guide strip 4 and then moved longitudinally along the table and across a slot 5 through which the blade of the saw moves when the saw is swung to a cutting position. The long boards are to be cut into sections constituting short boards of desired predetermined length and when so cutting the long boards knots and other imperfections are to be eliminated but cutting a board in front of and then back of the imperfection and discarding this portion of the board. It is desired to have the long boards cut into short boards of predetermined lengths and the improved gauge is of such construction that it may be set for various lengths and the cuts then made in such position relative to the length of the long board that the short boards will be of the desired lengths and may be assembled in stacks or piles consisting of boards which are all of the same length.

The gauge is mounted along the side of the table in which the slot 5 is formed and has a base 6 consisting of a plurality of longitudinally extending bars 7 spaced transversely from each other by blocks 8, in order to provide longitudinally extending slots 9 in the base. Tie bolts 10 pass through the bars and the blocks, and when their nuts 11 are tightened, the bars will be firmly held in spaced relation to each other. Reinforcing bars 12 are welded, or otherwise secured against under faces of the bars 7 and prevent sagging of the base. Referring to Figures 2 and 3, it will be seen that upper portions of the bars 7 are reduced in width along confronting side edges to form channels 13 along upper portions of the slots and that the inner one of the bars 7 is cut to form a recess or groove 14 into which the boards fit as they are shifted longitudinally along the table and the gauge into position to be cut by the saw.

The gauge is of multiple construction so that boards of different predetermined lengths may be cut from the long boards and in order that this may be accomplished there have been provided a plurality of stops 15, each of which consists of a metal bar which is slidably mounted in a housing 16. The housings 16 carry casing 17 formed of sheet metal and the bottom faces of the housings are formed with depending lugs 18 which fit into the channels 13 of the base, where they are secured when nuts 19 carried by bolts or taps 20 are tightened. The taps pass through the slots and when their nuts are tightened the lugs have binding engagement with the side walls and bottoms of the channels but when the nuts are loosened the housings and the casings carried thereby may be shifted along the base to positions in which they will be spaced predetermined distances from the slot 5. In actual practice the abutment bars 15 will preferably be spaced one foot apart and the distance from the slot progressively increased by one foot from the slot to the last one of the abutments.

The bores 21 of the housings in which the abutment bars are slidably mounted each has its inner end communicating with a channel 22 in which an upstanding arm 23 mounted at the inner end of the abutment bar moves, and referring to Figure 2 it will be seen that the arm 23 is provided at its upper end with forks 24 secured to the lower end of an arm 25 extending downwardly from an elongated solenoid core 26. This core is formed of laminated metal and has one end portion surrounded by a solenoid coil 27 and its other end portion surrounded by the coil of a solenoid 28. The solenoids 27 and 28 are supported by brackets 29 and 30, the upper arm 31 of the core is located between upper portions of these brackets and cooperates with the lower arm 25 and the arm 23 of the abutment bar to limit sliding movement of the solenoid core. When the solenoid 27 is energized the core will be drawn forwardly and the abutment bar projected out of the housing 16 into position to form a stop and when the solenoid 28 is energized the core will be drawn rearwardly and cause the abutment to be held in its retracted or inoperative position. When the abutment is to be brought into use the solenoid 27 is energized to project the abutment outwardly and the solenoid 28 de-energized so that it does not interfere with forward movement of the abutment.

The wiring for the gauge is shown in Figure 5, and referring to this figure it will be seen that there have been provided a plurality of switches 32 corresponding in number to the number of abutments and mounted in a switch box 32a located at the side of the table 1 along which the guide strip 4 extends and in such relation to the saw and the gauge, that a workman can conveniently reach the switch and also operate the saw and make adjustments to shift the abutments along the base if necessary.

The switches 32 are of duplicate construction and each has a center contact 33 with which a wire 34 leading from a negative main wire 35 is connected and side contacts 36, 37, 38, and 39 for engagement by a movable contact 40. The movable contact is normally in engagement with the contacts 38 and 39 but is movable into engagement with the contacts 35, 36, and 37 so that the abutment may be moved to an extended position for use. The contacts 37 of the switches are connected with wires 41 leading to the coils of the solenoids 27, the other ends of these solenoids being connected with a positive main wire 42 which is also connected with ends of the coils of the solenoids 28. The other ends of the coils of the solenoids 28 are connected to wires 43 leading from the contacts 39 of the switches and to the contacts 38 are attached branch wires 44 leading from a wire 45 which also has branch wires 46 connected to the contacts 36 of the switches. Normally the movable contacts 40 of the switches are in engagement with the contacts 38 and 39, but since it is not in engagement with the contact 33 a circuit will not be completed and current will not be wasted.

When a saw equipped with the improved gauge is in use, long boards which are to be cut into shorter lengths are placed upon the table 1 and individually moved into engagement with the guide 4 and then shifted longitudinally along the table and across the slot 5 as indicated by dotted lines in Figure 1. The operator estimates the length of board between its front end and the first knot or other imperfection and then presses the switch button corresponding to this distance, which will be assumed to be three feet. When the button for the three foot switch is pressed, its movable contact 40 is moved into engagement with the contacts 33, 36, and 37 and current flows through the wires 34 and 35 to the switch and through the movable contact to the contacts 36 and 37 with which the wires 41 and 46 are connected. The wire 41 leading from this switch is connected with the solenoid 27 of the three foot gauge and attracts the core 26 so that the stop bar 15 of this gauge will be moved to an extended position for engagement by the front end of the board. Current flowing through the wire 36 of the three foot switch and the wire 27 will pass to the movable switches 40 of all of the other switches and through their contacts 39 and the wires 43 to the solenoids 28 of all of the other gauges and the energized solenoids will attract the companion cores 26 and hold the abutment bars 15 in a retracted position. It will thus be seen that only the abutment bar of the three foot gauge will be moved to an extended position and that the abutment bars of all of the other gauges will be retracted and held in an inoperative position. The operator then swings the saw into position to cut through the board in front of the knot. The short board which has been cut from the long board is then removed, the long board shifted forwardly to a position in which its portion bearing the knot may be cut off and the long board again shifted forwardly until another knot is encountered, the proper switch being then closed so that the corresponding abutment bar will be shifted to an extended position, at the same time retracting the three foot abutment bar and all of the other abutment bars held in a retracted position. The selected abutment bar will remain extended until the button is pushed to extend a different abutment bar at which time the previously selected bar is retracted.

It will thus be seen that a long board may be easily cut into short boards of various predetermined lengths and all knots and other imperfections removed.

Having thus described the invention, what is claimed is:

1. A sawing gauge comprising a base for extending longitudinally of a table, along a side edge thereof, said base having longitudinally extending slots, spaced from each other transversely of the base, resting upon and extending transversely of the base, each gauge member having a housing open at its front end and an abutment bar slidable longitudinally in the housing from a retracted position to and extended position, fasteners extending downwardly from the housing through the slots and tightened to releasably hold the gauge in an adjusted position, a casing over said housing, an arm extending upwardly from the inner end of said abutment bar and into the casing, front and rear solenoids in said casing disposed in alignment parallel to the bar and having confronting ends spaced from each other, a common core for the solenoids having front and rear portions slidable longitudinally through coils of the solenoids and a portion midway its length extending vertically between the solenoids and provided with a lower arm secured to the upper end of the arm of the abutment bar and an upper arm cooperating with the lower arm to engage confronting ends of the solenoids and limit sliding of the core, and a circuit for said solenoids having therein switches for selectively energizing a front solenoid and moving the abutment of a predetermined gauge member controlled thereby to an extended position and simultaneously energizing the rear solenoids of the remaining gauge members to hold their abutment bars retracted.

2. A sawing gauge comprising a base for extending longitudinally of a table, along a side thereof, gauge members extending transversely of the base and shiftable along the base to adjusted positions, each gauge member having a housing extending transversely of the base and open at its front end, an abutment bar slidable longitudinally in the housing and movable through the front end thereof from a retracted position to an extended position, front and rear aligned solenoids over the housing extending longitudinally thereof and having confronting ends spaced from each other, a core common to both solenoids slidable through the solenoids with a portion extending between their spaced ends, an arm depending from the portion of the core between the solenoids and connected with the abutment arm, and a circuit for the solenoids having therein switches for selectively causing energizing the front solenoids of predetermined gauge members and movement of the abutment bar of one gauge member to an extended position and energizing the side solenoids of the remaining gauge members and thereby holding the abutment bars of the said remaining gauge members retracted.

3. A sawing gauge comprising a base having longitudinally extending bars and slots between the bars, upper portions of the bars being beveled along opposite sides of the slots and forming channels over the slots, gauge members extending transversely of the base and each having a housing resting upon the bars and open at its front end and formed with depending lugs fitting into the channels, fasteners passing through the slots and screwed into sockets formed in the lugs and tightened to releasably hold the housing in an adjusted position along the base, front and rear solenoids over the housing extending longitudinally thereof in spaced and aligned relation to each other, a core extending longitudinally between the solenoids and having front and rear portions slidable in cores of the solenoids, through confronting ends thereof, a circuit for said solenoids having therein switches for selectively energizing the front solenoid of a predetermined gauge member for moving the abutment bar of the said gauge member to an extended position and energizing the rear solenoids of the remaining gauge members for holding the abutment bars thereof retracted.

HAROLD C. CARMAN.

REFERENCES CITED

The following references are of record in the file of this patent:

UNITED STATES PATENTS

| Number | Name | Date |
|---|---|---|
| 1,290,658 | Reed | Jan. 7, 1919 |
| 1,800,382 | Grant | Apr. 14, 1931 |
| 2,276,607 | Bruno | Mar. 17, 1942 |
| 2,291,982 | Overacker et al. | Aug. 4, 1942 |
| 2,316,971 | Overacker et al. | Apr. 20, 1943 |